US005191180A

United States Patent [19]

Kitamura et al.

[11] Patent Number: 5,191,180

[45] Date of Patent: Mar. 2, 1993

[54] GAS-INSULATED SWITCHGEAR INCLUDING A VACUUM SWITCH, OPERATING MECHANISM AND PLURAL BELLOWS

[75] Inventors: Tadao Kitamura; Toshio Kobayashi; Yosikata Matsumura, all of Kanagawa, Japan

[73] Assignee: Fuji Electric Co., Ltd., Kanagawa, Japan

[21] Appl. No.: 728,368

[22] Filed: Jul. 11, 1991

[30] Foreign Application Priority Data

Jul. 19, 1990 [JP] Japan .................................. 2-191056

[51] Int. Cl.[5] ........................ H01H 33/66; H02B 7/01

[52] U.S. Cl. ............................. 200/144 B; 200/148 B

[58] Field of Search ........... 200/144 B, 148 R, 148 A, 200/148 B, 148 D, 148 F, 145

[56] References Cited

U.S. PATENT DOCUMENTS 3,814,882 6/1974 Harrold .......................... 200/144 B
4,426,560 1/1984 Kimblin .......................... 200/144 B
4,434,332 2/1984 Yanabu et al. .............. 200/144 B X
4,458,119 7/1984 Hashimoto et al. ........ 200/144 B X
4,593,165 1/1986 Steinemer .................. 200/148 F X

FOREIGN PATENT DOCUMENTS 62-43409 9/1987 Japan .

*Primary Examiner*—J. R. Scott
*Attorney, Agent, or Firm*—Finnegan, Henderson, Farabow, Garrett and Dunner

[57] ABSTRACT

A gas-insulated switchgear in which a vacuum switch main contact assembly constituted by a fixed contact element and a movable contact element is enclosed in a vacuum tank. The vacuum switch has a movable terminal fixed at its one end to the movable contact element and is led out from the vacuum tank through a bellows. The vacuum switch is enclosed in a gas tank filled with an insulating gas having gas pressure not less than the atmospheric pressure. The main contact assembly of the vacuum switch is operated so as to perform electrical connection and disconnection functions, through a transmission mechanism, by a driver provided outside of the gas tank. A driving rod transmits an operating force of the driver to the movable terminal of the vacuum switch. The driving rod is led out from the gas tank through another bellows mounted to the gas tank.

6 Claims, 4 Drawing Sheets

GAS-INSULATED SWITCHGEAR INCLUDING A VACUUM SWITCH, OPERATING MECHANISM AND PLURAL BELLOWS

BACKGROUND OF THE INVENTION

1. Field of the Invention

The present invention relates to a gas-insulated switchgear in which a vacuum circuit breaker, a vacuum switch, or the like, is housed in a gas tank having a bellows.

2. Discussion of Related Art

FIG. 4 is a sectional view illustrating a conventional gas-insulated switchgear. In a vacuum switch 1, a main contact assembly constituted by a fixed contact element 3 and a movable contact element 4 is housed in a vacuum tank 2 constituted by an insulation tank 2A and vacuum-sealing metal fittings 2B and 2C. One end of each of fixed terminal 5 and movable terminal 6 is fixedly attached to the fixed and movable contact elements 3 and 4, respectively. In a vacuum sealed state, the other end of the fixed terminal 5 is fixed and the other end of the movable terminal 6 is movably led out to the vacuum tank 2. The vacuum switch 1 is housed in a gas tank 7 filled with an $SF_6$ gas having gas pressure not less than the atmospheric pressure, and the fixed terminal 5 is electrically and conductively connected to a penetrating bushing 9A through a main circuit conductor 8. The movable terminal 6 is electrically and conductively connected to another penetrating bushing 9B through a flexible lead 10 and a main circuit conductor 11. The movable terminal 6 is further coupled through an insulating rod 12 with a transmission mechanism 13 for transmitting a driving force for causing the movable contact element 4 to perform switching in the axial direction. This transmission mechanism 13 is constituted by a driving rod 14 fixed to the insulating rod 12, a lever 15 coupled with the driving rod 14, and a rotary shaft 16 fixed to one end of the lever 15. The rotary shaft 16 is led out rotatably from the gas-sealed state of the gas tank 7 into the external environment and coupled with a not-shown driving means, for example, an air cylinder or the like.

In the thus arranged gas-insulated switchgear, the vacuum switch as a circuit breaker or a switch is so small that it is possible to make the configuration of the whole apparatus compact. The penetrating bushings 9A and 9B serve to lead currents of the respective main circuit conductors 8 and 11 into another gas tank or into a cable room. Although the sectional view of FIG. 4 shows the configuration of only one phase of a main circuit, usually, a switchgear has a three-phase configuration, in which case, the respective main circuits for the three phases are housed in the gas tank 7. Another words, the main circuits for the other two phases, each of which has the same configuration as shown in FIG. 4, are provided side by side at an interphase insulating distance in the direction perpendicular to the drawing.

The structure for leading out the movable terminal 6 of the vacuum switch from the vacuum tank 2 in the state of being vacuum-sealed is constituted by a cornice-shaped metal vacuum-sealing bellows 17 capable of expansion and contraction in its axial direction. The bellows 17 is disposed in the outer circumference of the movable terminal 6 coaxially therewith in a manner so that one end thereof is hermetically welded to the movable terminal 6 and the other end thereof is hermetically welded to an opening portion 19 of the metal fitting 2C of the vacuum tank 2. By this vacuum-sealing bellows 17, it is possible to absorb the axial-direction movement of the movable terminal 6 while keeping the vacuum state at the time of switching the main contact.

FIG. 5 is a sectional view illustrating a gas sealing configuration portion along the line 5—5 in FIG. 4, in which the rotary shaft 16 is provided through a cushion ring 22, a gas-sealing ring 23 and a bearing 24 in a metal cylinder 21 welded to the gas tank 7. One end 16A of the rotary shaft 16 is fixed to one end of the lever 15 in the gas while the other end 16B of the same is coupled with a not-shown driving means in the external environment. The one end 16A of the rotary shaft 16 is further extended to the left in FIG. 5 so as to be fixed also to the respective ends of levers of the other two phases. Thus, if rotation torque is applied to the rotary shaft 16 by the driving means, the lever 15 changes its angle simultaneously with the respective levers of the other phases. In this case, lever 15 changes its position to the position of lever 15A illustrated by the two-dotted chain line in FIG. 4 to thereby move the movable contact element 4 to switch through the driving rod 14 simultaneously with the corresponding parts of the other phases.

In FIG. 5, the bearing 24 makes the rotary shaft 16 rotatable. The gas-sealing ring 23 is constituted by a ring-shaped rubber material and includes a ring spring 23*a* for clamping therein the rotary shaft 16 in its radial direction, so that the surface of the rotating rotary shaft 16 is made to contact with the inner surface of the hollow cylinder 21 for the gas-sealing. The cushion ring 22 is made, for example, by fluorine resin, so as to serve as a steady brace in its radial direction. Usually, the inside pressure of the gas tank 7 is about several atms higher than the atmospheric pressure, while the inside of the vacuum tank 2 must be kept at a high vacuum, so that the gas-sealing of the gas tank 7 is not as difficult as the vacuum-sealing of the vacuum tank 2, and therefore, such a rubber packing system as mentioned above is employed in this sealing portion.

In such a gas-insulated switchgear as mentioned above, however, since a vacuum-sealing bellows is caused to expand/contract to the vacuum switch side by the gas pressure in the gas tank, there has been a problem in that the expansion/contraction force is applied to the driving means as a resistant force against the main contact opening operation.

The $SF_6$ gas in the gas tank is sealed with gas pressure usually higher than the atmospheric pressure, and the gas pressure is applied to the vacuum switch. Accordingly, the vacuum-sealing bellows is caused to expand in its axial direction toward the inside of the vacuum switch, so that a force is exerted to cause the movable contact element to press the fixed contact element through the movable terminal. Therefore, a force necessary to open the main contact becomes much larger as the gas pressure of the gas tank is higher, so that the driving means having a large driving force enough to open the vacuum switch is necessary while taking into consideration and compensating for the application of a resistant force caused by the gas pressure of the gas tank. In addition, in the case of an occurrence of a short-circuit fault inside the gas tank, the gas pressure of the gas tank rises temporarily by arc discharge, and in such a case, the resistant force further increases, so that there exists a possibility that the breaking speed of the vacuum switch decreases or the breaking becomes impossible. The increase in value of the gas pressure due to the short-circuit fault is unstable, such that the characteristic of an opening operation of the vacuum switch becomes scattered and unpredictable.

SUMMARY OF THE INVENTION

The present invention has been made in view of the above circumstances and has as an object of the present invention to provide a gas-insulated switchgear in which a vacuum switch is housed in a gas tank filled with an insulating gas having a gas pressure not less than the atmospheric pressure.

A further object of the present invention is to maintain the gas pressure of the insulating gas such that it does not give unfavorable effects onto the opening of the main contact of the vacuum switch.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the gas-insulated switchgear of this invention includes a main contact assembly constituted by a fixed contact element and a movable contact element which is housed in a vacuum tank, a vacuum switch having a movable terminal fixed at one end to the movable contact element and let out from the vacuum tank through a bellows and housed in a gas tank filled with an insulating gas having a pressure not less than the atmospheric pressure, whereby the main contact assembly of the vacuum switch is operated so as to perform connection and disconnection through a transmission mechanism, by a driving means provided outside of the gas tank, and a driving rod for transmitting an operation force of the driving means to the movable terminal of the vacuum switch, the driving rod being led out from the gas tank through a bellows.

In addition, in such a configuration, the bellows for sealing the gas tank is made to have an effective pressure-receiving area which is equal to that of the bellows for sealing the vacuum tank, or the bellows for sealing the gas tank is made to have an effective pressure-receiving area which is larger that of the bellows for sealing the vacuum tank.

Further, in addition to such a configuration, the bellows for sealing the gas tank is attached onto the inside of a hollow cylinder so as to project toward the inside of the gas tank.

BRIEF DESCRIPTION OF THE DRAWING

The accompanying drawings, which are incorporated in and constitute a part of this specification illustrate embodiments of the invention and, together with the description, serve to explain the objects, advantages and principles of the invention. In the drawings, FIG. 1 a sectional view illustrating an embodiment of the gas-insulated switchgear according to the present invention.

DETAILED DESCRIPTION OF THE PREFERRED EMBODIMENTS

According to the configuration of the present invention, since the driving rod for transmitting an operation force to the movable terminal of the vacuum switch is led out from the gas tank through the bellows, a force to press out the driving rod toward the external atmosphere side acts through the gas-sealing bellows corresponding to the differential pressure between the gas pressure of the gas tank and the atmospheric pressure, so that a force to press the movable terminal into the vacuum switch side is reduced to thereby reduce the resistant force applied to the driving means at the time of opening the main contact.

In the above-mentioned configuration, if the effective pressure-receiving area of the bellows for sealing the gas tank is made equal to that of the bellows for sealing the vacuum tank, the two bellows are caused to expand/contract to the same extent per unit differential pressure received by both of the bellows, and, as a result, the movable terminal is given only the force to press the movable terminal into the vacuum switch side by the atmospheric pressure. Accordingly, the resistant force applied to the driving means at the time of opening the main contact assembly does not depend on the gas pressure of the gas tank, so that the vacuum switch always has a stable opening characteristic even if the gas pressure increases.

On the other hand, if the effective pressure-receiving area of the bellows for sealing the gas tank is made large than that of the bellows for sealing the vacuum tank, the former bellows is caused to expand/contact to an extent larger than the latter bellows per unit differential pressure received by both of the bellows. Accordingly, the force to press the movable terminal into the vacuum switch side by the gas pressure almost disappears, in fact, it is possible to produce a force to pull out the movable terminal from the vacuum switch side, so that a driving force necessary for the driving means at the time of opening the main contact assembly can be made relatively small.

In the above-mentioned configuration, the bellow for sealing the gas tank is attached to the inside of the hollow cylinder such that even if a shock wave is caused due to flashover in the gas upon occurrence of a short-circuit fault inside the gas tank, the hollow cylinder acts as a barrier to prevent the gas-sealing bellows from receiving the shock wave directly to thereby prevent the gas-sealing bellows from being damaged.

The present invention will be described in reference to the accompanying figures.

Figure 1:
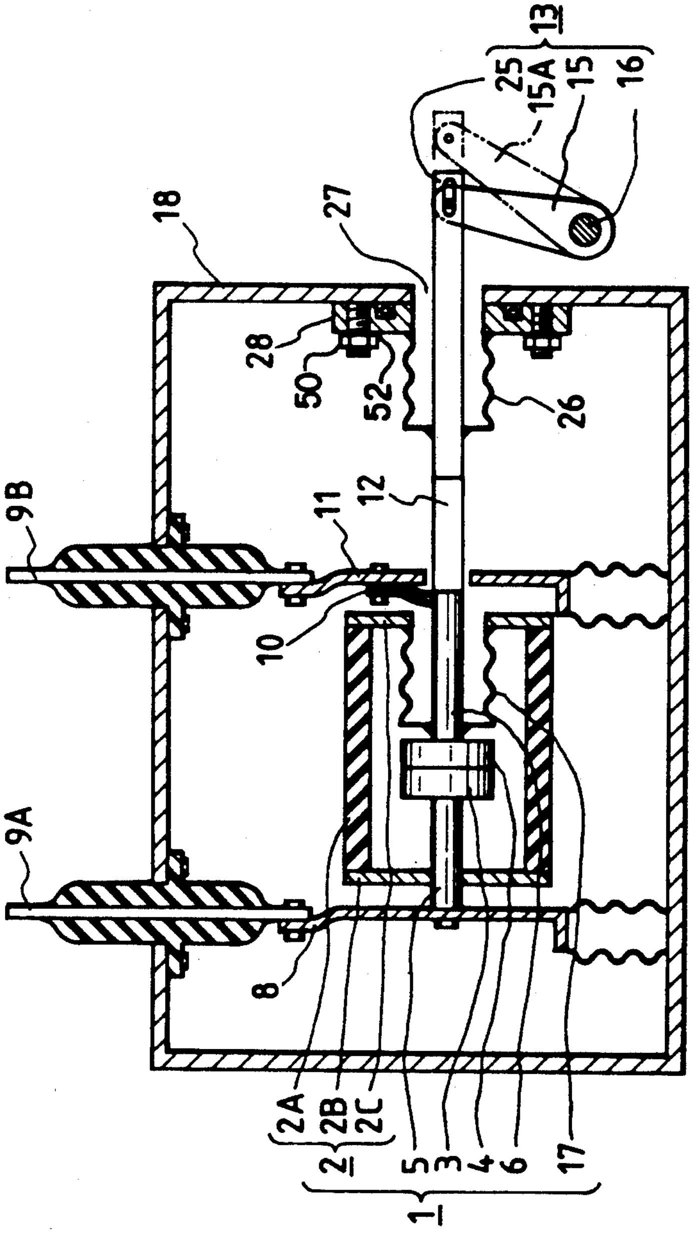
Figure 4:
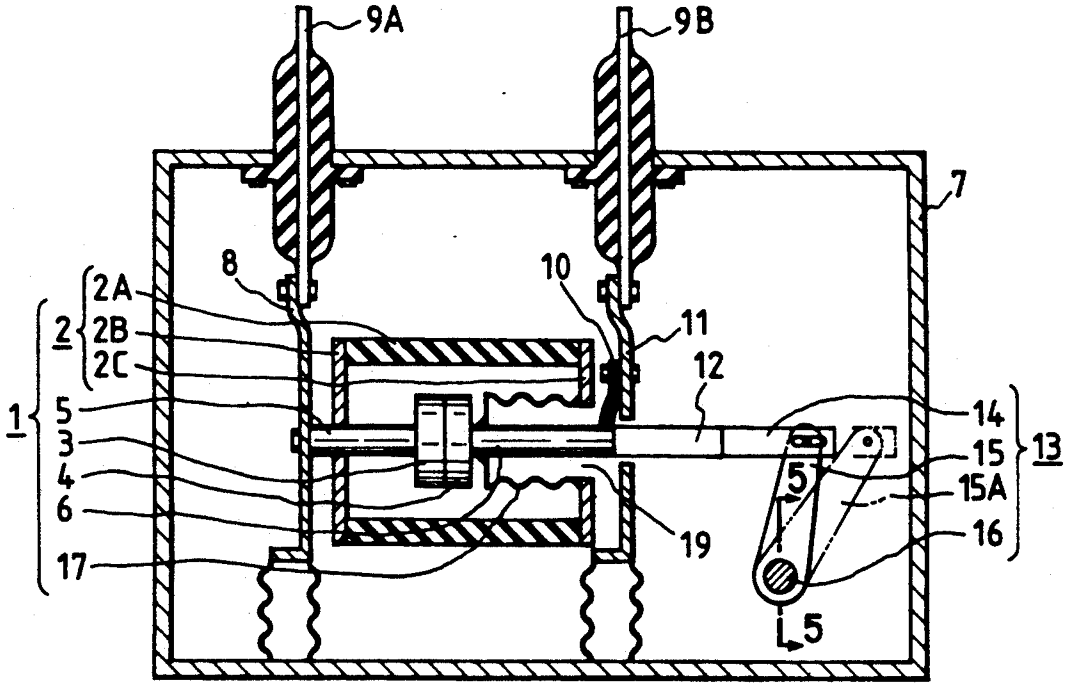
FIG. 4 PRIOR ART
FIG. 4 is a sectional view illustrating a conventional gas-insulated switchgear.
Figure 5:
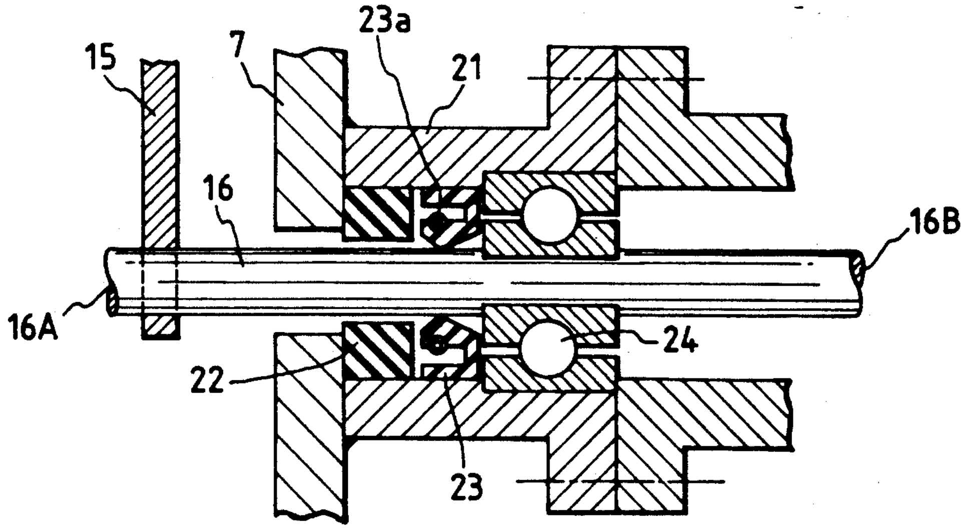
FIG. 5 PRIOR ART
FIG. 5 is a sectional view along the line 5-5 in FIG. 4.

FIG. 1 is a sectional view illustrating a gas-insulated switchgear according to the present invention, which has a configuration in which a cornice-shaped metal gas-sealing bellows 26 capable of expansion and contraction in its axial direction is provided in the outer circumference of a driving rod 25 coaxially therewith. One end of this gas-sealing bellows 26 is hermetically welded to the driving rod 25 while the other end is hermetically attached to an opening portion 27 of a gas tank 18. The driving rod 25 is coupled with a not-shown driving means through a rotary shaft 16 in the external atmosphere. The rest of the embodiment of FIG. 1 is similar to that of the conventional apparatus in FIG. 4, therefore, similar parts as those found in the conventional apparatus are referenced correspondingly and their detailed description will be omitted.

In FIG. 1, a flange 28 is attached gas-tight on the inner wall of the gas tank 18 through a rubber O-ring 52 by means of bolts 50 projecting on the inner wall of the gas tank 18, and the gas-sealing bellows 26 is hermetically welded to this flange 28.

A force to press out the driving rod 25 to the external atmosphere side (right of FIG. 1) is made to move through the gas-sealing bellows 26 by the differential pressure between the gas pressure and the atmospheric pressure, so that a force to press a movable terminal 6 to the vacuum switch 1 side by the gas pressure is reduced to thereby reduce a resistant force applied to the driving means by the gas pressure at the time of opening a main contact assembly. Although in the configuration of the gas-sealing bellows 26 in FIG. 1, the portion welded with the driving rod 25 is inside the gas tank 18, the above-mentioned function to reduce the resistant force would not change even if the configuration is changed so that the gas-sealing bellows 26 is attached so as to be turned leftside right and welded with the driving rod 25 outside of the gas tank 18. Thus, it is also possible to reduce the gas tank 18 by the axial length of the gas-sealing bellows 26.

Figure 2:
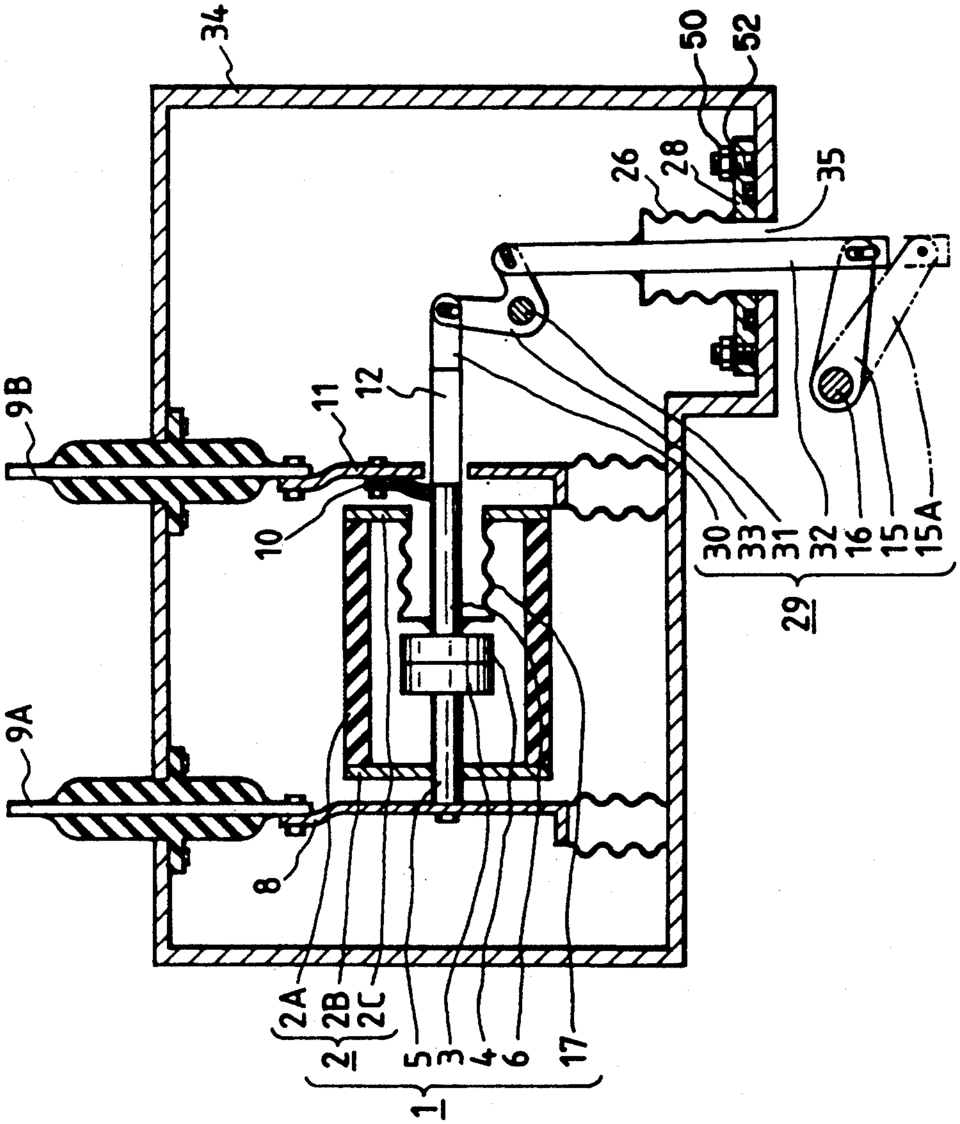
FIG. 2 is a sectional view illustrating another embodiment of the gas-insulated switchgear according to the present invention.

FIG. 2 is a sectional view illustrating a gas-insulated switchgear according to another embodiment of the present invention, in which a transmission mechanism 29 is provided with a driving rod 30 attached to an insulating rod 12, a V-shaped lever 33 and a driving rod 32. The lever 33 has one end coupled with the driving rod 30, an intermediate portion pivotally supported by a fixed shaft 31, and the other end coupled with the driving rod 32. The driving rod 32 penetrates an opening portion 35 of a gas tank 34 and is connected to a lever 15. This type of configuration is different from that of FIG. 1 in that the respective axial direction of a vacuum-sealing bellows 17 and a gas-sealing bellows 26 are different from each other by about 90 degrees, and so long as the transmission mechanism 29 can constitute a link mechanism, the reduction of the resistant force applied to the driving means does not change even though the angle may vary in any way.

The degree of expansion/contraction by the differential pressure between the vacuum-sealing bellows 17 and the gas-sealing bellows 26 almost depends on the average diameter of their cornice-shaped portion (the average value between the maximum outer diameter and the minimum inner diameter of the jagged trunk), having little influence from the axial-direction length of the cornice-shaped portion. This is because the area on which the differential pressure acts in the axial direction is considerably increased as the average diameter is made larger. In other words, the degree of the expansion/contraction is changed by such parameters as the jagged shape of the cornice-shaped portion, the hardness of its metal material, and the thickness of the penetrating rod. Thus, it can be considered that the degree of the expansion/contraction by unit differential pressure increases as the average diameter increases.

Therefore, by making the average diameter of the gas-sealing bellows 26, and, consequently the effective pressure-receiving area of the bellows 26, equal to that of the vacuum-sealing bellows 17, both of the bellows have almost the same degree of expansion/contraction per unit differential pressure received, so that on the balance, a movable terminal 6 is given a force only to press the movable terminal 6 into the vacuum switch side by the atmospheric pressure, and a resistant force applied to the driving means at the time of opening the main contact is independent of the gas pressure. Accordingly, even if the gas pressure is increased temporarily by an insulation fault, the vacuum switch 1 can always maintain its stable opening characteristic. In addition, even if the $SF_6$ sealing pressure of the gas tank is made high, it is not necessary to change the driving force of the driving means.

If the average diameter of the gas-sealing bellows 26 is made larger than that of the vacuum-sealing bellows 17, the degree of expansion/contraction of the former bellows 26 becomes larger than that of the latter bellows 27, per unit difference received by both of the bellows. Since the differential pressure received by the gas-sealing bellows 26 is always lower than that received by the vacuum-sealing bellows 17 by the atmospheric pressure, if the average diameter of the gas-sealing bellows 26 is made large such that the degree of expansion/contraction of the gas-sealing bellows 26 is larger than that of the vacuum-sealing bellows 17 by a value corresponding to the atmospheric pressure, that is, one atm, both of the bellows will have almost the same degree of expansion/contraction, so that it is possible to cancel a force to press the movable terminal 6 to the vacuum switch side by the gas pressure. In fact, if the average diameter of the gas-sealing bellows 26 is made even larger, a force to pull out the movable terminal 6 from the vacuum switch 1 acts upon the movable terminal 6, so that it is possible to largely reduce the driving force necessary for the driving means.

Figure 3:
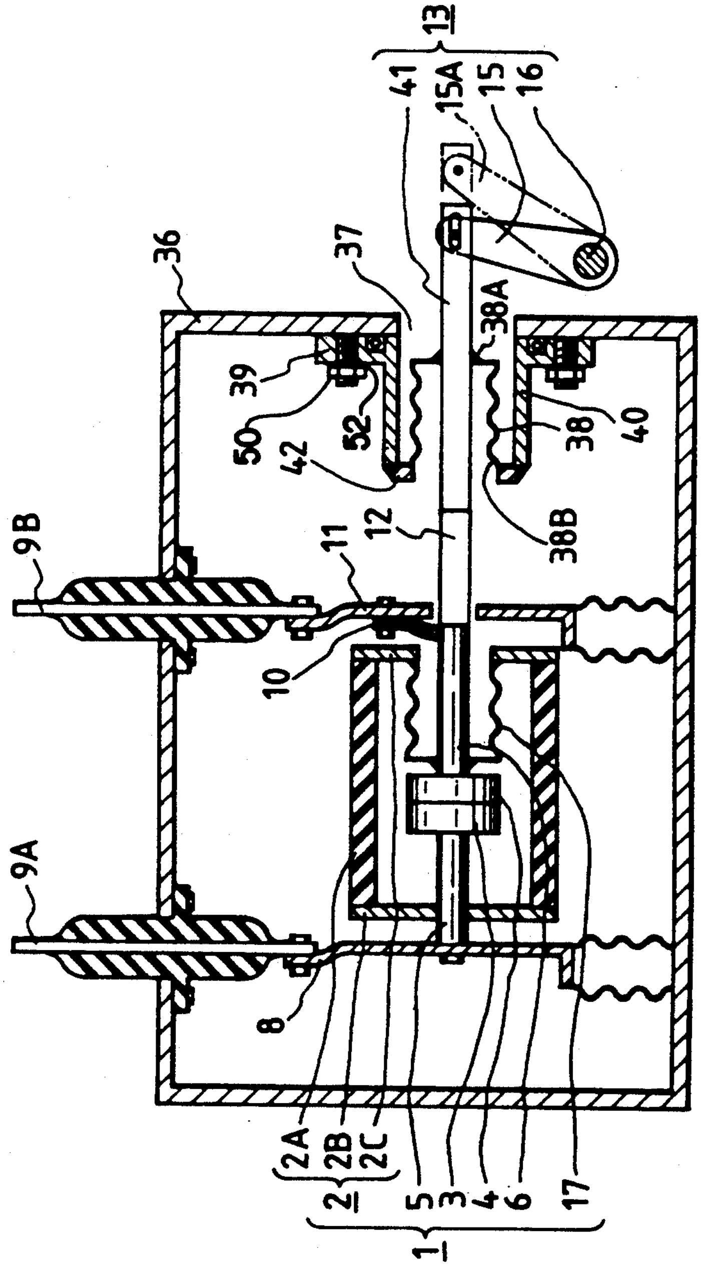
FIG. 3 is a sectional view illustrating another embodiment of the gas-insulated switchgear according to the present invention.

FIG. 3 is a sectional view illustrating a gas-insulated switchgear according to a further embodiment of the present invention, in which a gas-sealing bellows 38 is attached to an opening portion 37 of a gas tank 36. A hollow cylinder 40 having an inner diameter larger than the outer diameter of the gas-sealing bellows 38 is hermetically attached at its one end to the opening portion 37 of the gas tank 36 through a flange 39 so that the hollow cylinder 40 projects in its axial direction toward the inside of the gas tank 36. The gas-sealing bellows 38 is inserted into the inside of this hollow cylinder 40. One end 38A of the gas-sealing bellows 38 is welded to a driving rod 41 disposed in the direction of the external atmosphere side, and the other end 38B of the gas-sealing bellows 38 is welded to a flange 42 at a top end projection portion of the hollow cylinder 40. The rest of the configuration is similar to that of FIG. 1.

In FIG. 3, the flange 39 is attached gas-tight on the inner wall of the gas tank 36 through a rubber O-ring 52 by means of bolts 50 projecting from the inner wall of the gas tank 36. The flange 42 is welded to the hollow cylinder 40 after the gas-sealing bellows 38 is welded.

In FIG. 3, in such a configuration in which the gas-sealing bellows 38 is attached to the opening portion 37 of the gas tank 36 through the hollow cylinder 40, even if a shock wave occurs due to flashover in the gas upon a short-circuit fault inside the gas tank 36, the hollow cylinder 40 acts as a barrier so that the gas-sealing bellows 38 does not receive the shock wave directly to thereby prevent the gas-sealing bellows 38 from being damaged. Also in FIG. 3, although the one end 38A of the gas-sealing bellows 38 is disposed inside of the hollow cylinder 40, the function that the hollow cylinder 40 acts as a barrier against shock waves does not change even if the axial length of the hollow cylinder 40 is made short so that the end 38A of the gas-sealing bellows 38 protrudes to be disposed outside of the hollow cylinder 40. Accordingly, it is possible to reduce the gas tank 36 by the axial length of the gas-sealing bellows 38.

In a gas-insulated switchgear according to the present invention, as has been described, a driving rod for transmitting its operation force to a movable terminal of a vacuum switch is led out from a gas tank through a bellows. Accordingly, it is possible to reduce a force to press the movable terminal into the vacuum switch side, and a resistant force applied to a driving means at the time of opening a main contact is small enough, so that the driving means is made small.

In addition, if the effective pressure-receiving area of the gas-sealing bellows is made equal to that of a vacuum-sealing bellows for sealing a vacuum tank, the resistant force applied to the driving means at the time of opening the main contact does not depend on the gas pressure of the gas tank, so that the vacuum switch always has a stable opening characteristics even if the gas pressure increases.

In addition, if the effective pressure-receiving area of the gas-sealing bellows is made larger than that of the vacuum-sealing bellows, the force to press the movable terminal into the vacuum switch side by the gas pressure almost disappears. In fact, it is possible to produce a force to extract the movable terminal from the vacuum switch and act upon the movable terminal, so that it is possible to make a driving force necessary for the driving means at the time of opening the main contact assembly relatively small, and therefore, it is possible to make the driving means compact.

In a configuration as described in which the gas-sealing bellows is attached to the inside of a hollow cylinder, it is possible to provide an apparatus such that even if a shock wave caused by flashover in the gas is produced upon a short-circuit fault inside the gas tank, the gas-sealing bellows is prevented from being damaged.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A gas-insulated switchgear comprising:

a gas tank filled with an insulating gas having a gas pressure at least equal to atmospheric pressure, said gas tank including a first bellows;

a vacuum switch housed in said gas tank and including a vacuum tank having a second bellows, said vacuum switch having a movable terminal and a contact means enclosed in said vacuum tank, said contact means including a fixed contact element and a movable contact element, one end of said movable terminal being fixed to said movable contact element and extending from said vacuum tank through said second bellows, said movable and contact element of said contact means being movable to perform electrical connection and disconnection functions by driving means located outside of said gas tank; and a transmission mechanism including a driving rod for transmitting an operation force from said driving means to said movable terminal of said vacuum switch, said driving rod extending from said gas tank through said first bellows.

2. A gas-insulated switchgear according to claim 1, wherein said first bellows seals said gas tank and said second bellows seals said vacuum tank, said first bellows having an effective pressure-receiving area approximately equal to that of said second bellows.

3. A gas-insulated switchgear according to claim 1, wherein said first bellows seals said gas tank and said second bellows seals said vacuum tank, said first bellows having an effective pressure-receiving area larger than that of said second bellows.

4. A gas-insulated switchgear according to claim 1, wherein said gas tank further includes a hollow cylinder, said first bellows being disposed inside of said hollow cylinder so as to project toward inside of said gas tank.

5. A gas-insulated switchgear according to claim 1, wherein said driving rod is connected to said movable terminal through an insulating rod.

6. A gas-insulated switchgear according to claim 5, wherein said first bellows is coupled to said second bellows through said movable terminal, said insulating rod, and said driving rod.

* * * * *

UNITED STATES PATENT AND TRADEMARK OFFICE

CERTIFICATE OF CORRECTION

PATENT NO. : 5,191,180

DATED : March 02, 1993

INVENTOR(S) : Tadao Kitamura et al.

It is certified that error appears in the above-indentified patent and that said Letters Patent is hereby corrected as shown below:

Claim 1, column 8, line 18 after "and" insert --fixed-- and change "element" to --elements--.

Signed and Sealed this

Eighteenth Day of January, 1994

Attest:

BRUCE LEHMAN

Attesting Officer

*Commissioner of Patents and Trademarks*